March 19, 1940.   R. MacD. GRAHAM   2,194,304
CONTINUOS OILER FOR CENTRIFUGAL SEPARATORS
Filed Dec. 16, 1938   2 Sheets-Sheet 1

Inventor
Robert MacDonald Graham
By Barnett + Truman
Attorneys

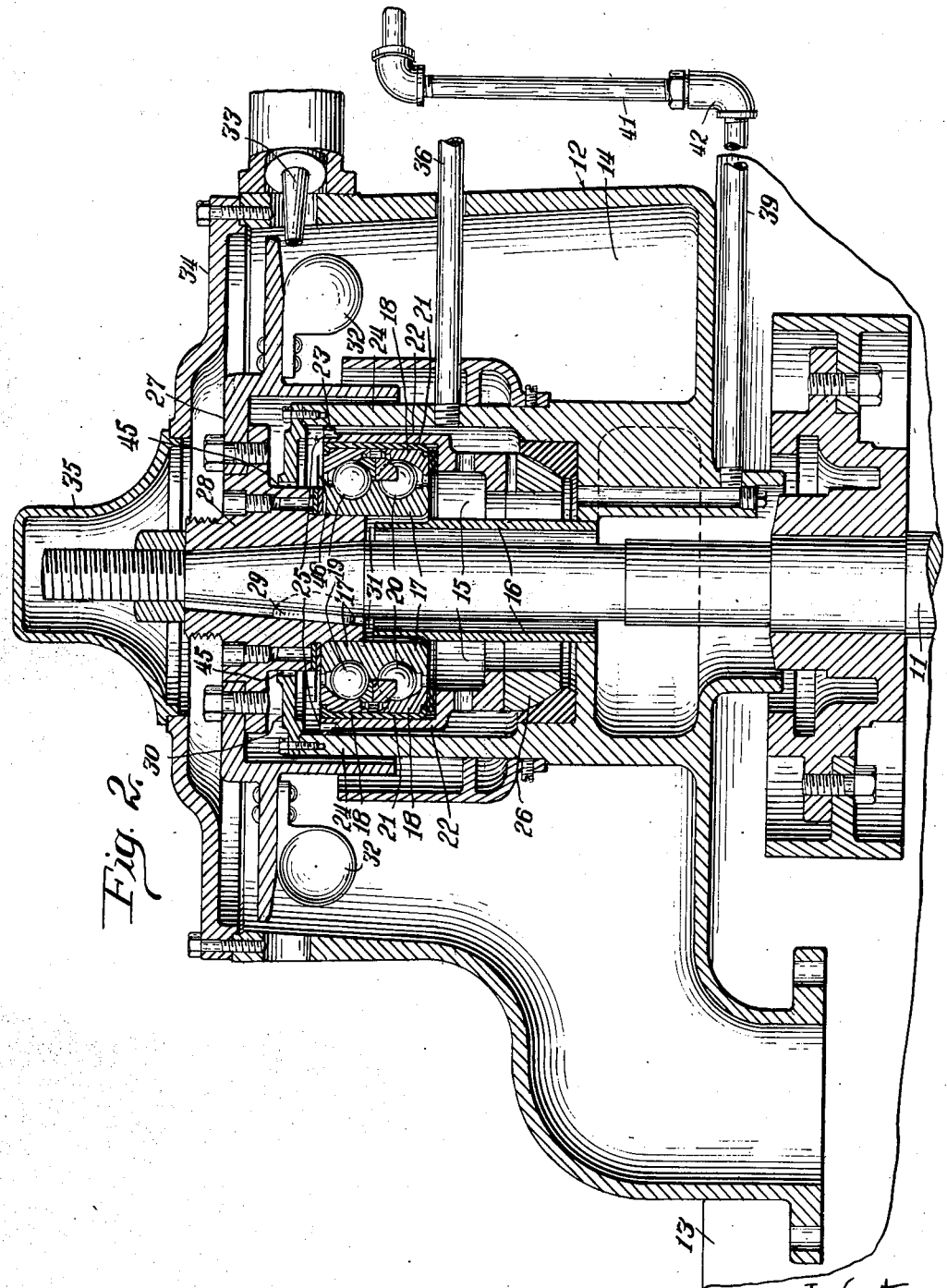

Patented Mar. 19, 1940

2,194,304

UNITED STATES PATENT OFFICE 2,194,304

CONTINUOUS OILER FOR CENTRIFUGAL SEPARATORS

Robert MacDonald Graham, Justice, Ill., assignor to Corn Products Refining Company, New York, N. Y., a corporation of New Jersey Application December 16, 1938, Serial No. 246,142

3 Claims. (Cl. 184—6)

This invention relates to an improved oiler for maintaining a continuous flow of oil to the bearings of a centrifugal separator of the type having a separator basket fixed to the lower end of a spindle which is suspended at its upper end in a bearing structure.

Considerable difficulty has been experienced in maintaining proper lubrication of the spindle bearings in apparatus of the above character, and at the same time preventing the oil from leaking or overflowing from the bearings into the material contained in the separator basket.

For the above reason, it has been customary, heretofore, to apply oil to the bearings from time to time through small holes in the bearing hub, but this method is unsatisfactory since the position of the bearings relative to the other moving parts of the apparatus makes it difficult to ascertain the quantity of oil contained in the chamber below the bearings. This condition is particularly true of the specific bearing structure herein shown in that the bearings are positioned in an oil chamber which is surrounded by a steam expansion chamber and in that the turbine or impulse wheel for rotating the spindle is positioned above the spindle bearings.

The principal object of the present invention is to provide an improved oiler for apparatus of the above character which will insure proper lubrication of the spindle bearings without danger of oil leaking or overflowing from the bearings and which will be reliable in its operation. In this connection the invention contemplates the provision of improved means for maintaining a continuous flow of oil to the spindle bearings and for maintaining oil in the bearing casing at a substantially uniform level.

Another and more specific object of the invention is to provide novel and improved means adapted to be operated by the spindle of a centrifugal separator to cause the lubricant forced upwardly through the bearings by centrifugal force to be returned immediately to the oil chamber below the said bearing and thereby maintain continuous circulation of oil through the spindle bearings.

Figure 1:
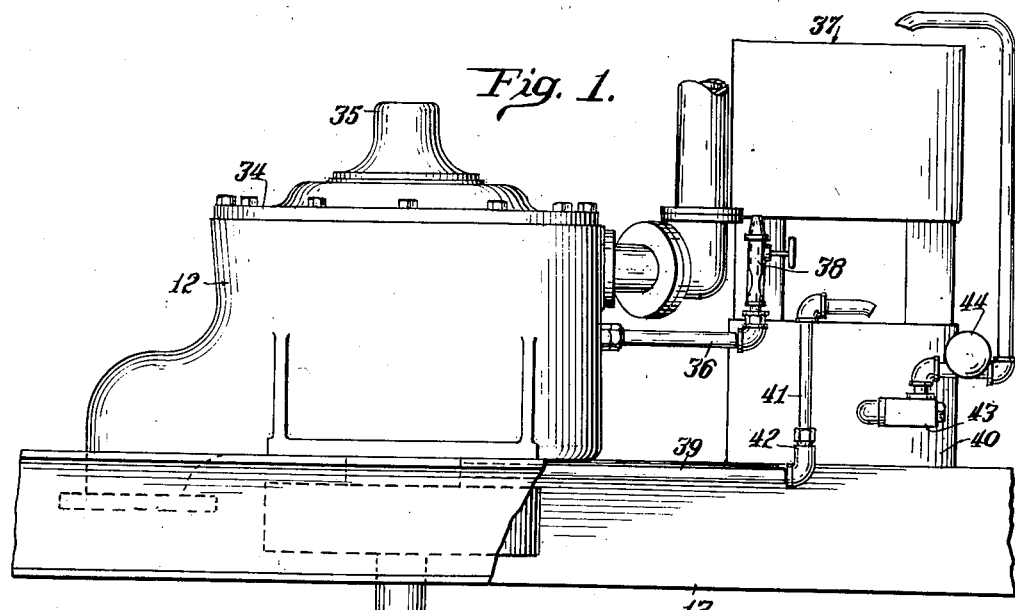
Figure 1:
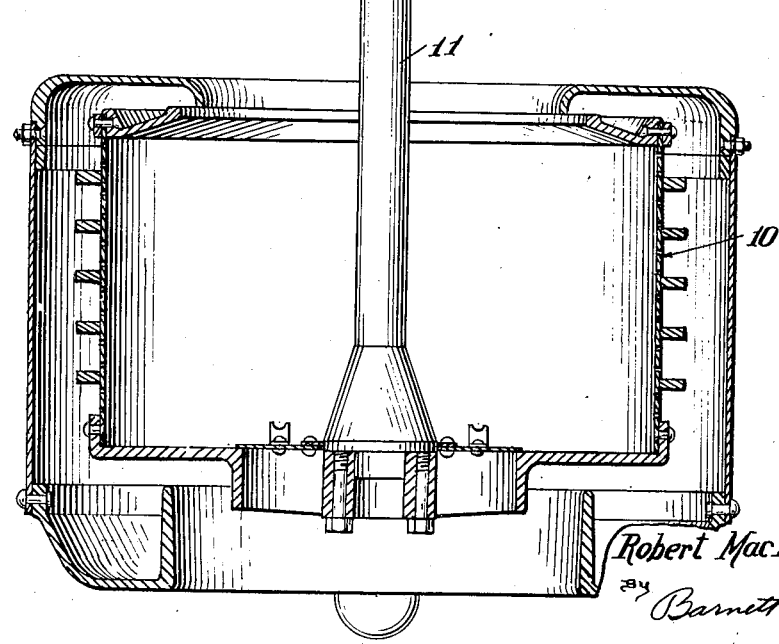

Other objects and advantages of the invention will be readily apparent from the detailed description of the embodiment of the invention shown in the accompanying drawings, wherein:

Fig. 1 is a side view partly in section and partly in elevation of a centrifugal separator provided with a lubricator made in accordance with this invention, and Fig. 2 is a vertical section taken through the bearing structure and the spindle operating means shown at the upper end of Fig. 1.

Referring to the drawings, 10 designates a rotating basket of a centrifugal separator, 11 the spindle to which the basket is secured, 12 a housing for the mechanism which supports and operates the spindle 11, and 13 designates suitable supporting means for the housing 12.

The housing 12 is formed with a steam expansion chamber 14 and an annular channel 15, the latter of which is adapted to contain a quantity of oil for lubricating the spindle bearings. The inner wall 16 of the oil chamber is preferably in the form of bushing fitted in a central opening of the housing 12. The spindle 11 is revolubly suspended at its upper end by means of an anti-friction bearing structure positioned in the said oil chamber 15 of the housing. The said bearing structure comprises inner and outer concentric rings 17 and 18 provided with suitable ball races for containing upper and lower sets of balls 19 and 20. The inner ring 17 has a fixed relation to the spindle 11 so as to rotate therewith. The outer rings 18—18, being secured together by a band 21, are fitted in the upper end of a cylindrical member 22. This member is formed at its upper end with a lateral flange 23 for engaging the outer wall 24 of said oil chamber 15. A plurality of holes 25 in the said flange provides suitable passages for returning any oil from the space above the bearing to the main body of oil in the chamber 15. The lower end of the member 21 seats on a ring 26 of a ball and socket structure positioned in the bottom of the oil chamber.

The spindle 11 is rotated by means of a turbine or impulse wheel 27, the hub portion 28 of which is keyed to the spindle by means of a key 29. The said hub preferably extends downwardly through an opening in the cover plate 30 of the oil chamber and carries at its lower end the inner ring 17 of the anti-friction bearing. Preferably, there is a slight clearance 31 between the lower face of the turbine wheel hub and the upper edge of the inner wall 16 of the oil chamber. A plurality of turbine buckets 32 are suitably secured to the wheel 27 so as to extend into the outer chamber 14 in a position to be engaged by a jet of steam discharged from a nozzle 33. A cover plate 34 and a bonnet 35 provide removable closures for the upper portion of the housing 12.

The oil is fed by gravity into the chamber 15 through a supply pipe 36 leading from an oil chamber to a supply reservoir 37. A valve 38, preferably of the sight drip type is interposed in the supply pipe to control the amount of oil delivered to the oil chamber. The amount of oil so delivered is preferably greater than the amount required to maintain the body of oil in the chamber 15 at a predetermined level. However, a constant level of oil is maintained in the said chamber by means of an overflow pipe 39 leading from the chamber to a receiving reservoir 40. Preferably, the overflow pipe is adjustable vertically, for example, by raising or lowering the pipe section 41 in the fitting 42 so that the oil in the chamber 15 can be maintained at any level required to effect thorough lubrication of the bearings without danger of the oil flowing over the upper edge of the wall 16. Preferably, the oil level, when the apparatus is at rest, is maintained substantially at the center of the lower ball 20. The oil discharged from the overflow pipe 39 is received by the reservoir 40. It is then passed through a suitable strainer 43 and is elevated by the pump 44 to the supply reservoir 37. In this way any grit in the oil is removed and the oil is recirculated through the bearings in the chamber 15.

When the inner ring 17 of the ball bearing rotates, oil is thrown upwardly through the bearing by centrifugal force. This has resulted, heretofore, in the accumulation of an excess amount of oil above the bearing, a portion of which was lost by overflowing through the opening 45 of the cover 30. In order to prevent such excess accumulation of oil above the bearing, a relatively thin disc 46 is fixed to the turbine wheel hub 28 so as to overlie the bearing rings 17—18. The said disc functions to throw the oil outwardly toward the holes 25 in the lateral flange of the member 22. The said oil is therefore directed to the openings 25 through which it is returned, without loss, to the main body of oil below the bearings.

While the invention is illustrated in connection with a specific embodiment in which the oil is fed from a central source of supply to a single centrifugal separator, it will be understood, however, that the oil from the supply reservoir can be supplied to a number of such machines in the manner herein illustrated and that various structural changes might be made without departure from the spirit of the invention. It will be understood, therefore, that the invention contemplates all such changes in structure coming within the scope of the appended claims.

I claim:

1. In a continuous oiler for a centrifugal separator of the type in which a vertical spindle carries a separator basket at its lower end, and an impulse wheel at its upper end and is revolubly suspended at its upper end in a bearing structure positioned beneath said impulse wheel and including a casing having an annular oil chamber surrounding the said spindle, a top cover for the chamber having a central opening for loosely receiving the spindle, ball-bearing members for the spindle extending into said chamber at a location adjacent said top cover and separating the oil chamber into a relatively small compartment above the bearing and a larger lower compartment for the oil; means for maintaining a substantially constant level of oil in said chamber comprising a supply reservoir, a supply conduit leading from the reservoir to said chamber, an overflow conduit communicating with said chamber and positioned to maintain the oil in said chamber at a level above the lower face of a rotating member of the ball-bearing, whereby rotation of said members causes the oil to flow upwardly through the bearing to thoroughly lubricate the same, and means for preventing leakage of oil through the spindle opening in the top cover comprising a revoluble member positioned above said ball-bearing at a location adjacent the said opening in said cover and in the path of the upwardly moving oil whereby said oil engaging said rotating member is thrown outwardly toward the outer wall of the chamber.

2. In a continuous oiler for a centrifugal separator of the type in which a vertical spindle carries a separator basket at its lower end and an impulse wheel at its upper end and is revolubly suspended at its upper end in a bearing structure positioned beneath said impulse wheel and including a casing having an annular oil chamber, a cover plate therefor having a central opening for loosely receiving the spindle, ball-bearing members for the spindle extending into said chamber at a location in relatively close relation to said cover plate, whereby the oil chamber is separated into a relatively small compartment above the ball-bearing structure and a larger lower compartment; means for maintaining a substantially constant level of oil in said chamber comprising a supply reservoir, a supply conduit leading from the reservoir to said chamber, an overflow conduit communicating with said chamber and positioned to maintain the oil in the chamber at a level above the lower face of a rotating member of the ball-bearing, whereby the rotation of said member causes the oil to flow upwardly through the bearing to thoroughly lubricate the same, and means for preventing excessive accumulation of oil in said upper compartment and consequent leakage through the opening in said cover comprising a disc having a fixed relation to the spindle and revoluble therewith above said ball-bearing at a location adjacent the spindle opening in said cover and in the path of the upwardly moving oil, whereby the oil engaging said disc is thrown outwardly toward the outer wall of the chamber, there being a down passage adjacent the said outer wall for returning the oil to the lower compartment of the oil chamber.

3. In a continuous oiler for a centrifugal separator of the type in which a vertical spindle carries a separator basket at its lower end and is revolubly suspended at its upper end in a bearing structure including a casing having an annular steam chamber and an annular oil chamber, a cover plate for the oil chamber having a central opening for loosely receiving the said spindle, ball and socket rings positioned in the lower portion of the oil chamber to permit the spindle and bearing members to assume angular positions relative to said casing, a cylindrical housing positioned on the ball ring associated with said socket ring and formed at its upper end with a flange for engaging the outer wall of the oil chamber, a ball-bearing structure fitted in said housing at a location adjacent said top cover and extending downwardly into the oil chamber, and an impulse wheel secured to the upper end of the spindle and extending beyond the oil chamber and into said steam chamber; means for maintaining a substantially constant level of oil in said oil chamber comprising a supply reservoir, a supply conduit leading from the reservoir to said chamber, an overflow conduit communicating with said chamber and positioned to maintain oil in said chamber at a level above the lower face of a rotating member of said ball-bearing, whereby the rotation of said member causes the oil to flow upwardly through the bearing, a disc having a fixed relation to the spindle and revoluble therewith at a location adjacent the opening in said cover above said ball-bearing and in the path of the upwardly moving oil and adapted to throw the oil engaging the same outwardly toward the outer wall of said chamber, there being a plurality of openings in the flange of said housing and in the side wall thereof, whereby the oil thrown outwardly by said disc reenters the lower portion of the oil chamber so as to again pass through the said ball-bearing.

ROBERT MacDONALD GRAHAM.